United States Patent
Babar et al.

(10) Patent No.: US 11,840,255 B2
(45) Date of Patent: Dec. 12, 2023

(54) METHOD FOR PARTIALLY OR FULLY AUTONOMOUSLY GUIDING A MOTOR VEHICLE

(71) Applicant: Continental Automotive GmbH, Hannover (DE)

(72) Inventors: Ketan Babar, Frankfurt am Main (DE); Stefan Feick, Bad Soden (DE)

(73) Assignee: Continental Automotive GmbH, Hannover (DE)

( * ) Notice: Subject to any disclaimer, the term of this patent is extended or adjusted under 35 U.S.C. 154(b) by 108 days.

(21) Appl. No.: 17/305,353

(22) Filed: Jul. 6, 2021

(65) Prior Publication Data

US 2022/0001890 A1    Jan. 6, 2022

(30) Foreign Application Priority Data

Jul. 3, 2020    (DE) .................... 102020208391.6

(51) Int. Cl.
*B60W 60/00*    (2020.01)
*B62D 15/02*    (2006.01)

(52) U.S. Cl.
CPC ......... *B60W 60/001* (2020.02); *B62D 15/021* (2013.01); *B60W 2420/42* (2013.01); *B60W 2552/30* (2020.02)

(58) Field of Classification Search
CPC .......... B60W 60/001; B60W 2420/42; B60W 2552/30; B60W 2520/10; B60W 2530/10; B60W 2530/201; B60W 2552/53; B60W 2555/20; B60W 2710/207; B62D 15/021; B62D 15/025; B62D 6/001; B62D 15/02
USPC ......................................................... 701/23
See application file for complete search history.

(56) References Cited

U.S. PATENT DOCUMENTS

| | | | | |
|---|---|---|---|---|
| 8,078,373 B2* | 12/2011 | Deng | ........................ | B60T 7/22 |
| | | | | 477/145 |
| 9,180,880 B2* | 11/2015 | Okumura | ............ | B60W 30/045 |
| 9,731,762 B2* | 8/2017 | Hass | ................... | B62D 15/0265 |
| 10,081,367 B2* | 9/2018 | Mangette | ................... | B66F 9/06 |
| 10,899,381 B2* | 1/2021 | Itou | ..................... | B62D 15/0285 |
| 10,990,101 B2* | 4/2021 | Zhu | ...................... | G05D 1/0088 |
| 11,260,849 B2* | 3/2022 | Zhu | ...................... | B60W 10/18 |
| 11,565,742 B2* | 1/2023 | Stoltze | ................. | B62D 15/025 |
| 2005/0197746 A1* | 9/2005 | Pelchen | ............. | B60G 21/0555 |
| | | | | 701/1 |
| 2010/0228438 A1* | 9/2010 | Buerkle | ............... | B62D 15/025 |
| | | | | 701/41 |

(Continued)

FOREIGN PATENT DOCUMENTS

CN    102574526 A    7/2012
CN    105460008 A    4/2016

(Continued)

OTHER PUBLICATIONS

Japanese Office Action dated Jul. 9, 2021 for the counterpart Japanese Patent Application No. 10 2021 0086064.

(Continued)

*Primary Examiner* — Hunter B Lonsberry
*Assistant Examiner* — Robert Louis Pinkerton

(57) ABSTRACT

A method for partially or fully autonomously guiding a motor vehicle includes setting a target steering angle for guiding along a target trajectory. It is checked whether a zero point shift exists between a current position of the motor vehicle with respect to the target trajectory. The set target steering angle is adjusted on the basis of a correction constant in the event that a determined zero point shift exceeds a predefined threshold.

16 Claims, 3 Drawing Sheets

Increase in the correction constant for a left-hand bend

Reduction in the correction constant for a left-hand bend

(56) References Cited

U.S. PATENT DOCUMENTS

| | | |
|---|---|---|
| 2011/0144865 A1 | 6/2011 | Niemz |
| 2012/0197478 A1 | 8/2012 | Niemz |
| 2013/0103263 A1* | 4/2013 | Hsu .................. B60W 10/20 701/42 |
| 2014/0019007 A1* | 1/2014 | Okumura ............ B60T 8/1755 701/41 |
| 2016/0090100 A1 | 3/2016 | Oyama et al. |
| 2017/0313304 A1 | 2/2017 | Nagase |
| 2018/0170377 A1* | 6/2018 | Tatsukawa ........... B60W 30/12 |
| 2018/0253104 A1* | 9/2018 | Miyamoto ........... G05D 1/0274 |
| 2018/0304918 A1* | 10/2018 | Kunihiro ............ B62D 5/0463 |
| 2019/0023319 A1* | 1/2019 | Tyrrell ................ B62D 6/003 |
| 2019/0106149 A1 | 4/2019 | Kunihiro et al. |
| 2019/0324463 A1 | 10/2019 | Zhu |
| 2019/0359202 A1 | 11/2019 | Kong |
| 2019/0361438 A1 | 11/2019 | Zhu |
| 2020/0307551 A1* | 10/2020 | Horiguchi ............ B60W 30/02 |
| 2020/0310439 A1* | 10/2020 | Kato .................. G01C 21/3492 |
| 2021/0403081 A1* | 12/2021 | Funke ................ B62D 6/001 |
| 2022/0048511 A1* | 2/2022 | Munko ............... B60T 8/17552 |

FOREIGN PATENT DOCUMENTS

| | | |
|---|---|---|
| DE | 102006060628 A1 | 6/2008 |
| DE | 102008002699 A1 | 12/2009 |
| DE | 102014005447 A1 | 9/2014 |
| JP | 2001291197 A | 10/2001 |
| JP | 2006126980 A | 5/2006 |
| JP | 2010513123 A | 4/2010 |
| JP | 2017197005 A | 11/2017 |
| JP | 2018167734 A | 11/2018 |
| JP | 2019069745 A | 5/2019 |
| JP | 2019189214 A | 10/2019 |
| JP | 2019202764 A | 11/2019 |
| JP | 2019202765 A | 11/2019 |
| KR | 20080012459 A | 2/2008 |

OTHER PUBLICATIONS

Korean Decision for Grant of Patent dated Sep. 14, 2021 for the counterpart Korean Patent Application No. 10-2021-0086064.
Japanese Notice of Reasons for Refusal dated Jul. 22, 2022 for the counterpart Japanese Patent Application No. 2021-090004.
German Search Report dated Jan. 28, 2021 for the counterpart German Application No. 10 2020 208 391.6.
German Office Action dated Jul. 26, 2023 for the counterpart German Patent Application 10 2020 208 391.6.
Chinese Office Action dated Aug. 25, 2023 for the counterpart Chinese Patent Application No. 202110682719.8 and DeepL translation of same.

* cited by examiner

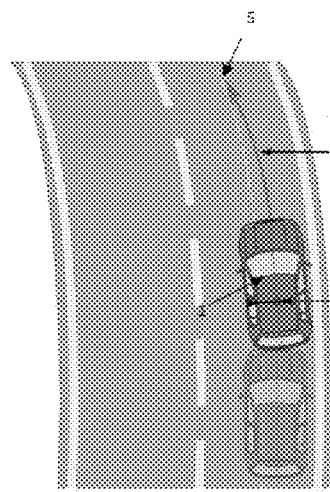 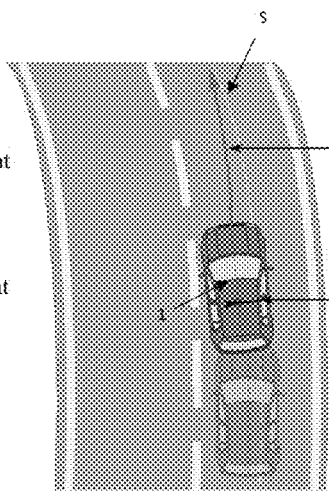
Increase in the correction constant for a left-hand bend
Reduction in the correction constant for a left-hand bend
Fig. 1a
Fig. 1b
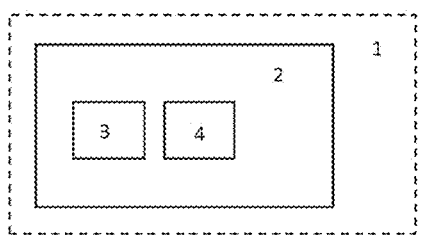
Fig. 2

METHOD FOR PARTIALLY OR FULLY AUTONOMOUSLY GUIDING A MOTOR VEHICLE

CROSS-REFERENCE TO RELATED APPLICATION

This application claims priority to German patent application No. 10 2020 208 391.6, filed on Jul. 3, 2020, which is hereby incorporated by reference.

TECHNICAL FIELD

The technical field relates generally to a method and a device for partially or fully autonomously guiding a motor vehicle.

BACKGROUND

Modern motor vehicles are now frequently equipped with driver assistance systems. For transversely controlling driver assistance systems such as, e.g., a lane departure warning system, a target steering angle of the ego vehicle, among other things, is to be determined in order to forward said target steering angle to a control unit for executing the transverse control. Accordingly, information regarding the steering angle is of great importance, wherein a high degree of both accuracy and reliability is required.

When determining the target steering angle, an attempt is made to consider a vehicle-specific steering angle offset in order to avoid a transverse position error in the transverse control. The establishment of the vehicle-specific steering angle offset is usually illustrated by way of a factor which is already applied ex-works. In particular, the factor is established once, having recourse to a so-called model steering angle which is determined, e.g., from the so-called Ackermann's formula which essentially compares the steering angle of a vehicle wheel to a yaw rate signal and the driving speed of the vehicle. Once the factor has been applied, it will not be changed again.

However, this form of establishing the factor does not consider factors which are already influencing the steering angle, such as, e.g., a change of tires, road conditions, increased or reduced friction in the steering system, a varying mechanical elasticity in the steering system, or a change in vehicle mass due to a trailer. Accordingly, the factor which is established once at the start of the vehicle's life cycle may reflect a correct steering angle offset within the framework of the required accuracy, but may be too inaccurate or incorrect at a later stage. The consequence is a transverse offset when controlling the vehicle along a target trajectory.

As such, it is desirable to present a method and a device which avoids a transverse position error during the guiding of a motor vehicle along a target trajectory. In addition, other desirable features and characteristics will become apparent from the subsequent summary and detailed description, and the appended claims, taken in conjunction with the accompanying drawings and this background.

BRIEF SUMMARY

A method for partially or fully autonomously guiding a motor vehicle having the following steps is proposed. A target steering angle is set for guiding along a target trajectory. The target trajectory is, for example, a determined trajectory for pulling into or out of a parking space or the course of the middle of the traffic lane on which the motor vehicle is currently located. The target steering angle is preferably established by means of a curvature requirement predefined by a driver assistance device or evaluation unit. The driver assistance device is, for example, a lane departure warning system or a parking, lane guidance or congestion assistance device.

In particular, the formula for establishing the target steering angle is factor*curvature. In particular, the factor serves to compensate for a steering angle offset, in other words a transverse position error. The factor is preferably determined by means of a steering angle model, in particular by means of a single-track model as follows:

$$\text{Factor} = l + \frac{m}{l}\left(\frac{l_h C_{ah} - l_v C_{av}}{C_{av} C_{ah}}\right) v^2$$

m=motor vehicle mass
$l_v$=distance between center of gravity and front axle
$l_h$=distance between center of gravity and rear axle
$C_{av}$=transverse stiffness of the front axle
$C_{ah}$=transverse stiffness of the rear axle
v=motor vehicle speed Additionally, it can optionally be provided that the factor is adjusted to vehicle-specific parameters of the motor vehicle such as, e.g., the vehicle mass, distance between axles, torque, stiffness of the front and rear axle, which influence the steering angle. The vehicle parameters are known thanks to the respective motor vehicle in which the device for guiding the motor vehicle is installed.

It is checked whether a zero point shift exists between a current position of the motor vehicle with respect to the target trajectory. In particular, the zero point shift is a transverse position error which leads to transverse offset guiding of the motor vehicle with respect to the target trajectory. The zero point shift with respect to the target trajectory can be determined, for example, by means of sensor data, e.g., camera image data of a camera unit inside the motor vehicle.

The set target steering angle is adjusted on the basis of a correction constant in the event that the determined zero point shift exceeds a predefined threshold. The predefined threshold is, in particular, a specified, maximum permitted lateral deviation with respect to the target trajectory. The predefined threshold is preferably a fixed threshold, consequently in other words a threshold which is specified once and cannot be varied. However, it can likewise be provided that the threshold is specified, e.g., depending on the traffic situation, in particular depending on the width of the road and/or the speed of the vehicle.

The target steering angle to be adjusted is preferably determined as follows: target steering angle to be adjusted=correction constant*set target steering angle.

In particular, the correction constant is determined as follows:

$$\text{Correction constant} = \frac{\text{factor} + \text{zero point shift}}{\text{factor}}$$

The determined target steering angle which is to be adjusted is in particular output to a control device of the motor vehicle, which actuates the adjustment of the target steering angle.

With the method presented it is possible to combine an extremely wide range of factors which influence the steering angle characteristics in a simple manner. By compensating for the transverse position error which can also only develop over the lifetime of the motor vehicle, reliable and safe guidance of the motor vehicle is guaranteed in the long term. In this way, a zero point shift can also be reliably adjusted without considering the multitude of influencing factors. As a consequence, a regular check of the currently existing steering angle offset and correspondingly adaptive adjustment in order to ensure safe driving is achieved.

According to a preferred embodiment, a static zero point shift is exclusively corrected on the basis of the correction constant, wherein in order to establish a zero point shift as static, an offset curve with respect to the target trajectory is determined over a specified time window and the determined offset curve is averaged. In particular, the mean value is acquired as a static zero point shift in the event that the latter has exceeded a predefined correction threshold, wherein a correction offset is specified by means of the acquired zero point shift, by means of said correction offset the set target steering angle is adjusted. Accordingly, the target steering angle is merely adjusted if the motor vehicle constantly has a zero point shift to the left or right over a specified distance despite the curvature which is preferably corrected by way of the factor. In particular, dynamic zero point shifts are excluded in this way. This results in the advantage that dynamic influencing factors such as, for example, a crosswind do not flow into the correction constant. Consequently, the method and the device continue to be robust against sources of interference.

A further preferred embodiment provides that the determined zero point shift is corrected in a stable manner. This is intended to prevent a volatile correction of the set target steering angle and, as a consequence, to give the vehicle operator the feeling of safe and comfortable guidance.

It is preferred that the adjustment of the set target steering angle on the basis of the correction constant is excluded in the event that interference effects have been determined, which adversely affect the determination of a static zero point shift. The interference effects are, e.g., a crosswind, an inclined roadway, an executed steering movement by the driver or an unstable driving situation such as oversteering or unsteering. Interference effects can be determined, for example, by means of sensors, alternatively by dynamics in the steering process.

Furthermore, it is preferred that a check of an existing zero point shift and the adjustment of the correction constant take place cyclically. Consequently, the correction constant is, in particular, regularly updated to the last determined correction constant, if necessary. In addition, it is preferred that in the case of delay signals which influence the zero point shift, these are considered in a subsequent cycle in order to be able to consider significant influential variables in the correction constant in a timely manner.

A further subject-matter of the invention relates to a device for partially or fully autonomously guiding a motor vehicle along a target trajectory, comprising a servo drive having a motor, an electronic control unit for actuating the motor, wherein the electronic control unit is configured to carry out a method according to the preceding description. The device is preferably a driver assistance device such as, e.g., a lane guidance assistance device.

The device can in particular comprise a microcontroller or processor, a central processing unit (CPU), a graphics processing unit (GPU), a digital signal processor (DSP), an ASIC (Application Specific Integrated Circuit), an FPGA (Field Programmable Gate Array) and the like, and software for carrying out the corresponding method steps.

A further subject-matter of the invention relates to a motor vehicle having a device according to the preceding description.

BRIEF DESCRIPTION OF THE DRAWINGS

Further developments, advantages and possible applications of the invention are also set out by the following description of exemplary embodiments and by the figures.

The invention will be explained in greater detail below on the basis of the figures with reference to exemplary embodiments, wherein:

FIGS. 1a and 1b show an exemplary traffic scenario, in which a zero point shift exists in the guidance of the motor vehicle along a target trajectory;

FIG. 2 shows a block diagram of a device for guiding the motor vehicle along the target trajectory;

DETAILED DESCRIPTION

FIG. 1a shows, by way of example, a zero point shift offset to the right and FIG. 1b shows a zero point shift offset to the left during the guidance of the motor vehicle 1 along a target trajectory S. Such a particularly constantly running zero point shift can result, for example, from mechanical defects or changes, wherein the cause of the zero point shift frequently cannot be ascertained by the system and, correspondingly, can only be compensated for with difficulty.

Against this background, a device 2 is provided, which is configured to partially or fully autonomously guide the motor vehicle 1, as shown in the block diagram in FIG. 2. For example, an evaluation device 3 is configured in order to establish a target steering angle for guiding along a target trajectory S and to output it to a control device 4 which is configured to actuate the setting of the target steering angle. For example, the evaluation device 3 is configured to check whether a zero point shift exists between a current position of the motor vehicle 1 with respect to the target trajectory S. In particular, the evaluation device 3 is configured to determine a correction constant; on the basis of the latter the set target steering angle is adjusted, provided that the determined zero point shift exceeds a predefined threshold. The correction constant is determined, e.g., as follows:

$$\text{Correction constant} = \frac{\text{factor} + \text{zero point shift}}{\text{factor}}$$

$$\text{Factor} = l + \frac{m}{l}\left(\frac{l_h C_{ah} - l_v C_{av}}{C_{av} C_{ah}}\right) v^2$$

m=motor vehicle mass, l_v=distance between center of gravity and front axle, l_h=distance between center of gravity and rear axle, C_av=transverse stiffness of the front axle, C_ah=transverse stiffness of the rear axle, v=motor vehicle speed.

The threshold can, for example, be a fixed transverse position error threshold of +/−15 cm. The determined target steering angle to be adjusted is preferably output to the control device 4 which is configured to actuate the adjustment of the target steering angle. For the exemplary traffic scenario in FIG. 1a, the correction constant is in particular adjusted along the left-hand bend, and for that in FIG. 1b the correction constant is reduced.

Figure 3A:
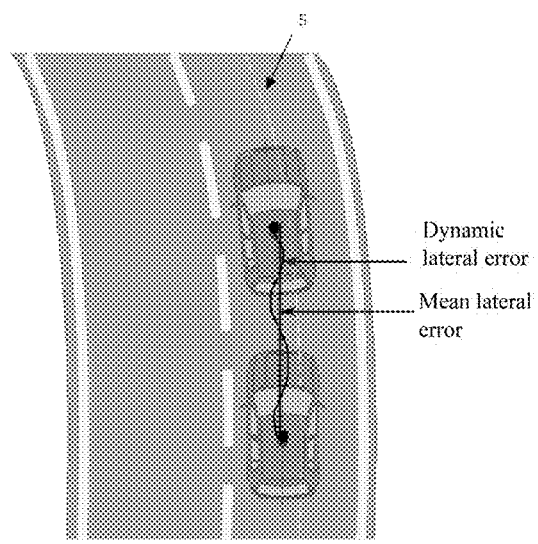
FIGS. 3a and 3b show an example for determining a static zero point shift between a current position of the motor vehicle with respect to the target trajectory.
Figure 3B:
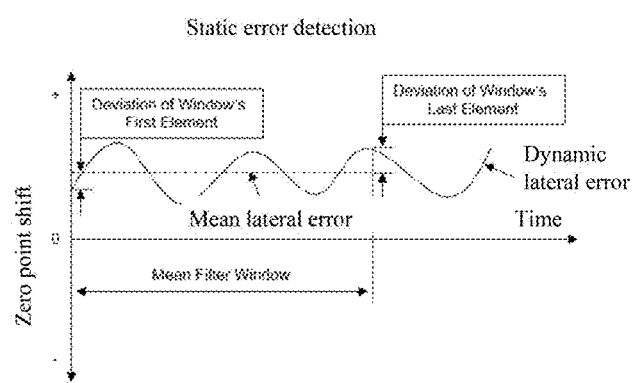

FIG. 3a shows a dynamic zero point shift along the target trajectory and an averaged zero point shift in a bird's-eye view over an established distance. For example, a static zero point shift is exclusively to be corrected. In order to determine the zero point shift as static, it is for example provided that an offset curve, which is shown in FIGS. 3a, 3b as a dynamic lateral error, is determined with respect to the target trajectory over a specified time window or over a specified distance and, herefrom, the offset curve is to be averaged. In particular, the mean value is acquired as a static zero point shift in the event that the latter has exceeded a predefined correction threshold. The correction threshold is, for example, a predefined minimum time window or a specified minimum distance that has to be exceeded in order to specify a zero point shift as static. In particular, a correction offset is specified by means of the acquired zero point shift, by means of said correction offset the set target steering angle is adjusted.

Figure 4:
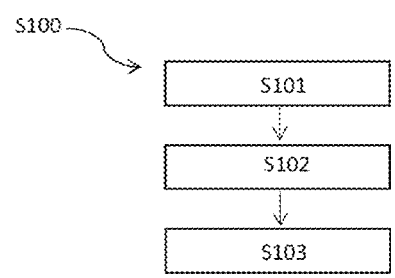
FIG. 4 shows a flow chart of a method.

FIG. 4 shows a flow chart of a method S100 for controlling the motor vehicle 1 along a target trajectory S by means of a partially or fully autonomous device. The method comprises the following steps: setting a target steering angle for guiding along a target trajectory S S101, checking whether a zero point shift exists between a current position of the motor vehicle 1 with respect to the target trajectory S S102, adjusting the set target steering angle on the basis of the correction constant K S103 in the event that a determined zero point shift exceeds a predefined threshold.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for partially or fully autonomously guiding a motor vehicle, comprising:
    setting a target steering angle for guiding the motor vehicle along a target trajectory;
    determining a zero point shift between a current position of the motor vehicle and the target trajectory; and
    adjusting the set target steering angle based on a correction constant in response to the determined zero point shift exceeding a predefined threshold,
    wherein the correction constant is determined on the basis of the determined zero point shift and a factor, wherein the factor is determined by a single-track model and subsequently adjusted to vehicle-specific parameters of the motor vehicle.

2. The method according to claim 1, wherein a static zero point shift is exclusively corrected on the basis of the correction constant, wherein in order to establish a zero point shift as static, an offset curve with respect to the target trajectory is determined over a specified time window and the determined offset curve is averaged, wherein the mean value is acquired as a static zero point shift in the event that the latter has exceeded a predefined correction threshold, wherein a correction offset is specified by means of the acquired zero point shift, by means of said correction offset the set target steering angle is adjusted.

3. The method according to claim 2, wherein the determined zero point shift is corrected in a stable manner.

4. The method according to claim 3, wherein the adjustment of the set target steering angle on the basis of the correction constant is excluded in the event that interference effects have been determined, which adversely affect the determination of a static zero point shift.

5. The method according to claim 4, wherein a check of a zero point shift and adjustment of the correction constant take place cyclically, wherein in the case of delay signals which influence the zero point shift, these are considered in a subsequent cycle.

6. The method according to claim 4, wherein the determined interference effects are determined by sensors of the motor vehicle and comprise at least one of crosswind or an inclined roadway.

7. The method according to claim 1, wherein the zero point shift with respect to the target trajectory is determined based on camera image data of a vehicle camera unit.

8. The method according to claim 1, wherein the factor is based upon at least one of mass of the motor vehicle, a distance between a center of gravity of the motor vehicle and a front axle thereof, a distance between the center of gravity and a rear axle of the motor vehicle, transverse stiffness of the front axle, transverse stiffness of the rear axle, or a speed of the motor vehicle.

9. The method according to claim 1, wherein the factor is represented by $$\text{Factor} = 1 + \frac{m}{l}\left(\frac{l_h C_{ah} - l_v C_{av}}{C_{av} C_{ah}}\right)v^2$$

where m is motor vehicle mass, $l_v$ is a distance between a center of gravity of the motor vehicle and a front axle thereof, $l_h$ is a distance between the center of gravity and a rear axle of the motor vehicle, $C_{av}$ is a transverse stiffness of the front axle, $C_{ah}$ is a transverse stiffness of the rear axle, and v is motor vehicle speed.

10. The method according to claim 1, wherein the correction constant is represented by $$\text{Correction constant} = \frac{\text{factor} + \text{zero point shift}}{\text{factor}}.$$

11. A device for partially or fully autonomously guiding a motor vehicle along a target trajectory, comprising:
    a servo drive having a motor; and
    an electronic control unit for actuating the motor;
    wherein the electronic control unit is configured to carry out a method comprising
        setting a target steering angle for guiding the motor vehicle along a target trajectory,
        determining a zero point shift between a current position of the motor vehicle and the target trajectory, and
        adjusting the set target steering angle based on a correction constant in response to the determined zero point shift exceeding a predefined threshold,
    wherein the correction constant is determined based on the determined zero point shift and a factor, wherein the factor is determined by a single-track model and subsequently adjusted to vehicle-specific parameters of the motor vehicle.

12. The device according to claim 11, wherein a static zero point shift is exclusively corrected on the basis of the correction constant, wherein in order to establish a zero point shift as static, an offset curve with respect to the target trajectory is determined over a specified time window and the determined offset curve is averaged, wherein the mean value is acquired as a static zero point shift in the event that the latter has exceeded a predefined correction threshold, wherein a correction offset is specified by means of the acquired zero point shift, by means of said correction offset the set target steering angle is adjusted.

13. The device according to claim 11, wherein the adjustment of the set target steering angle on the basis of the correction constant is excluded in the event that interference effects have been determined, which adversely affect the determination of a static zero point shift, the determined interference effects are determined by sensors of the motor vehicle and comprise at least one of crosswind or an inclined roadway.

14. The device according to claim 11, wherein the factor is based upon at least one of mass of the motor vehicle, a distance between a center of gravity of the motor vehicle and a front axle thereof, a distance between the center of gravity and a rear axle of the motor vehicle, transverse stiffness of the front axle, transverse stiffness of the rear axle, or a speed of the motor vehicle.

15. The device according to claim 11, wherein the factor is represented by $$\text{Factor} = l + \frac{m}{l}\left(\frac{l_h C_{ah} - l_v C_{av}}{C_{av} C_{ah}}\right)v^2$$

where m is motor vehicle mass, $l_v$ is a distance between a center of gravity of the motor vehicle and a front axle thereof, $l_h$ is a distance between the center of gravity and a rear axle of the motor vehicle, $C_{av}$ is a transverse stiffness of the front axle, $C_{ah}$ is a transverse stiffness of the rear axle, and v is motor vehicle speed.

16. The device according to claim 11, wherein the correction constant is represented by $$\text{Correction constant} = \frac{\text{factor} + \text{zero point shift}}{\text{factor}}.$$

* * * * *